No. 647,534. Patented Apr. 17, 1900.
J. D. SMITH & B. PARSONS.
MACHINE BELT FASTENER.
(Application filed June 14, 1899.)
(No Model.)
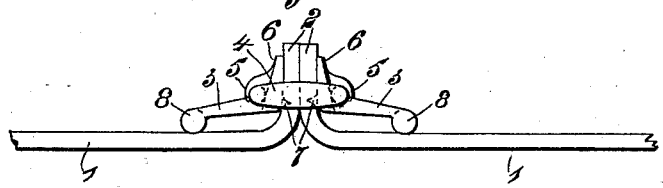
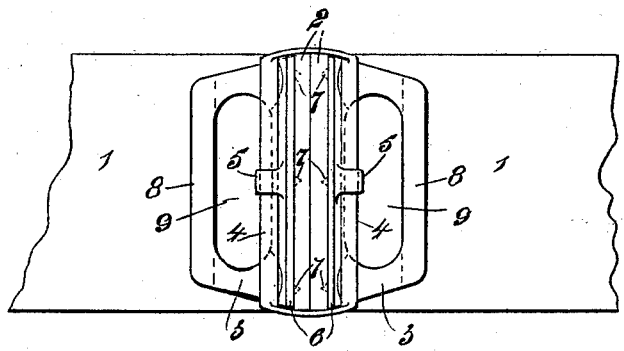
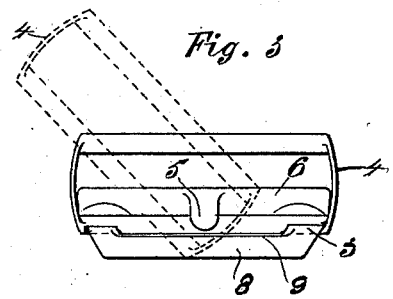
WITNESSES:
INVENTORS
John Denniston Smith
Benjamin Parsons
BY
ATTORNEYS

UNITED STATES PATENT OFFICE.

JOHN DENNISTON SMITH AND BENJAMIN PARSONS, OF DUNEDIN, NEW ZEALAND.

MACHINE-BELT FASTENER.

SPECIFICATION forming part of Letters Patent No. 647,534, dated April 17, 1900.

Application filed June 14, 1899. Serial No. 720,588. (No model.)

*To all whom it may concern:*

Be it known that we, JOHN DENNISTON SMITH and BENJAMIN PARSONS, subjects of the Queen of Great Britain, residing at 2 Commercial Chambers, Manse street, Dunedin, in the Colony of New Zealand, have invented an Improved Machine-Belt Fastener, of which the following is a specification.

This invention relates to belts used upon machinery, and has for its object to provide a device for fastening or joining together the ends of belts in such a manner that punching the same is avoided, adjustment and tightening is readily and easily accomplished, and a length of belting may be placed over the pulleys and cut to length after fastening.

We are aware that belt-fasteners have been made in a number of forms, and do not claim the use of these broadly, but confine ourselves to the construction set forth herein.

A fastener made according to our invention clamps the ends of the belt passed up from beneath and between two jaws formed on two frames, which are pivoted together by a connecting-link, which has a length sufficient to admit the belt. The outer bars of the frames rest upon the belt, and thus keep the jaws closed upon and gripping the ends of the belt. The inner faces of the jaws may be roughened or provided with teeth to assist in gripping the belt. Such teeth will also mark the belt and facilitate finding the correct position when putting on the belt a second time. The connecting-link is readily placed upon the frames without fitting.

The accompanying drawings illustrate the invention.

Figure 1 is a side view of the fastener. Fig. 2 is a plan of the same. Fig. 3 is an end view showing the link raised and by dotted lines showing the link ready for placing in position on the frame.

Similar figures of reference indicate corresponding parts.

Upon the drawings 1 is the belt, having upturned ends 2. The fastener comprises frames 3, pivoted to the connecting-link 4 by hooks 5, made solid with the frames. The said connecting-link is curved at its ends, as shown, to offer as little obstruction as possible upon the sides of the belt. The jaws 6 of the frames are armed with teeth 7, and the outer bars 8 of the frames rest upon the belt 1 and force the said teeth into the ends 2. The link 4 is placed upon the frames by placing it in the position shown by dotted lines on Fig. 3, the hole 9 in the frames permitting this to be done. It is then passed along and under the hook 5 until it is in the position shown by full lines on Fig. 3, when it will fall over the jaw 6 and may be similarly placed upon the other frame, as shown on Figs. 2 and 3. The hooks 5 keep the link in place when the belt is working.

What we claim as our invention, and desire to secure by Letters Patent, is—

In combination, the gripping-jaws, the frame extending from the same, a loop extending over the jaws to form a pivot for the same, and a hook extending from the rear side of the jaws and extending centrally over the sides of the loop to form the pivotal bearing and prevent the sides from spreading under strain.

In witness whereof we have hereunto set our hands in the presence of two witnesses.

JOHN DENNISTON SMITH.
BENJAMIN PARSONS.

Witnesses:
A. J. PARK,
J. R. PARK.